(12) United States Patent
Wong

(10) Patent No.: US 9,127,898 B2
(45) Date of Patent: Sep. 8, 2015

(54) HEAT DISSIPATION CASE

(71) Applicant: Chih-Juh Wong, New Taipei (TW)

(72) Inventor: Chih-Juh Wong, New Taipei (TW)

( * ) Notice: Subject to any disclaimer, the term of this patent is extended or adjusted under 35 U.S.C. 154(b) by 223 days.

(21) Appl. No.: 13/958,567

(22) Filed: Aug. 4, 2013

(65) Prior Publication Data

US 2015/0034291 A1 Feb. 5, 2015

(51) Int. Cl.
*H05K 7/20* (2006.01)
*F28F 21/00* (2006.01)
*H04B 1/036* (2006.01)
*G06F 1/20* (2006.01)

(52) U.S. Cl.
CPC . *F28F 21/00* (2013.01); *G06F 1/20* (2013.01); *H04B 1/036* (2013.01)

(58) Field of Classification Search
CPC ... H05K 7/20; H05K 7/2039; H05K 7/20445; H05K 5/00; H05K 5/03; G06F 1/20; F28F 21/00
USPC ............ 361/679.01, 679.02, 679.03, 679.46, 361/679.54, 679.55, 679.56, 690–694, 704, 361/714; 206/45.21, 45.24–28, 307, 307.1, 206/308.1, 309, 320, 387.14, 387.15, 472; 174/50, 50.52, 520, 50.54; 312/223.1, 312/223.2; 165/80.2, 80.3, 104.33, 185, 165/121, 122; 224/191
See application file for complete search history.

(56) References Cited

U.S. PATENT DOCUMENTS

| | | | |
|---|---|---|---|
| 6,324,055 B1 * | 11/2001 | Kawabe | 361/679.54 |
| 7,573,710 B2 * | 8/2009 | Morino et al. | 361/679.55 |
| 8,355,248 B2 * | 1/2013 | Nishi | 361/679.55 |
| 8,537,555 B2 * | 9/2013 | Huang et al. | 361/714 |
| 8,960,421 B1 * | 2/2015 | Diebel | 206/45.2 |
| 2010/0110629 A1 * | 5/2010 | Dietz et al. | 361/679.55 |
| 2012/0326578 A1 * | 12/2012 | Wilson et al. | 312/223.1 |
| 2014/0000844 A1 * | 1/2014 | Chandaria | 165/80.2 |
| 2014/0110083 A1 * | 4/2014 | Cheng | 165/47 |
| 2015/0036291 A1 * | 2/2015 | Yuan | 361/690 |
| 2015/0065208 A1 * | 3/2015 | Balaji et al. | 455/575.8 |
| 2015/0076186 A1 * | 3/2015 | Wong | 224/191 |

* cited by examiner

*Primary Examiner* — Michail V Datskovskiy

(57) ABSTRACT

A heat dissipation case is used to dissipate heat of electronic equipment and contains: a body. The body includes a receiving chamber for receiving electronic equipment and a dissipation groove defined thereon and corresponding to the receiving chamber, wherein the metal plate and the dissipating piece are stacked in the dissipation groove, and electronic equipment is received in the receiving chamber and contacts with the dissipating piece so as to dissipates heat of the electronic equipment. The metal plate has a peripheral side retained in the body. The peripheral side of the metal plate extends into the metal plate completely, and an area of the metal plate is larger than that of the dissipating piece.

12 Claims, 15 Drawing Sheets

HEAT DISSIPATION CASE

FIELD OF THE INVENTION

The present invention relates to a protective case for electronic equipment, and more particular to a heat dissipation case.

BACKGROUND OF THE INVENTION

A conventional protective case is applied to prevent mobile phones and tablet PCs from scratch, so it contacts with outer surfaces of the mobile phones and the tablet PCs. However, such a contacting way will stop heat of the mobile phones and the tablet PCs being dissipated. To solve this problem, the protective case is removed from the mobile phones and the tablet PCs, thus losing the protective case easily.

The present invention has arisen to mitigate and/or obviate the afore-described disadvantages.

SUMMARY OF THE INVENTION

The primary object of the present invention is to provide a heat dissipation case which is used to protect electronic equipment and dissipate heat so as to prolong service life of the electronic equipment.

To obtain the above objectives, a heat dissipation case is used to dissipate heat of electronic equipment and contains: a body, the body includes a receiving chamber for receiving electronic equipment and a dissipation groove defined thereon and corresponding to the receiving chamber, wherein the metal plate and the dissipating piece are stacked in the dissipation groove, and electronic equipment is received in the receiving chamber and contacts with the dissipating piece so as to dissipates heat of the electronic equipment.

Preferably, the metal plate has a peripheral side retained in the body.

Preferably, the peripheral side of the metal plate extends into the metal plate completely, and an area of the metal plate is larger than that of the dissipating piece.

Preferably, the dissipating piece has a heat conducting layer, a carrying layer, and a heat removing layer, the carrying layer has a first face and a second face opposite to the first face, the heat conducting layer is in connection with the first face of the carrying layer, the heat removing layer couples with the second face of the carrying layer, such that the heat removing layer contacts with the electronic equipment so that the heat of the electronic equipment is conducted to the carrying layer quickly, and then the heat conducts to the metal plate from the carrying layer through the heat removing layer.

Preferably, the body further includes a positioning structure fixed thereon, the positioning structure includes a plurality of protecting ribs extending upwardly around four sides of the body, a free end of each protecting rib bends inwardly to form a locking portion, and among the body, the plurality of protecting ribs, and the locking portion is defined the receiving chamber.

Preferably, one of the plurality of protecting ribs corresponding to a speaker of the electron equipment has a first guiding slot being concaved downwardly therealong, and the locking portion has a plurality of sound orifices formed thereon and corresponding to the first guiding slot.

Preferably, one protecting rib of the plurality of protecting ribs corresponding to a microphone of the electronic equipment has a second guiding slot being concaved downwardly therealong, the locking portion also has a plurality of receiving orifices formed thereon and corresponding to the second guiding slot.

Preferably, the positioning structure also includes a bottom section and a plurality of protecting ribs extending upwardly around four sides of the bottom section so that among the bottom section, the plurality of protecting ribs, and the locking portion is defined the receiving chamber.

Preferably, the heat dissipation case further comprises a turning casing connecting with one side of the body and used to cover the body, the body also including a fixing element 80 so as to fix the body and the turning casing.

Preferably, the turning casing has plural crease lines pre-pressed thereon such that a user folds the plural crease lines so as to form a support seat of the body.

Preferably, the plural crease lines are pre-pressed in any one of a radiation shape, a Y shape, and a combined shape of plural triangles and polygons.

Preferably, wherein the body is a leather layer.

DETAILED DESCRIPTION OF THE PREFERRED EMBODIMENTS

Figure 1:
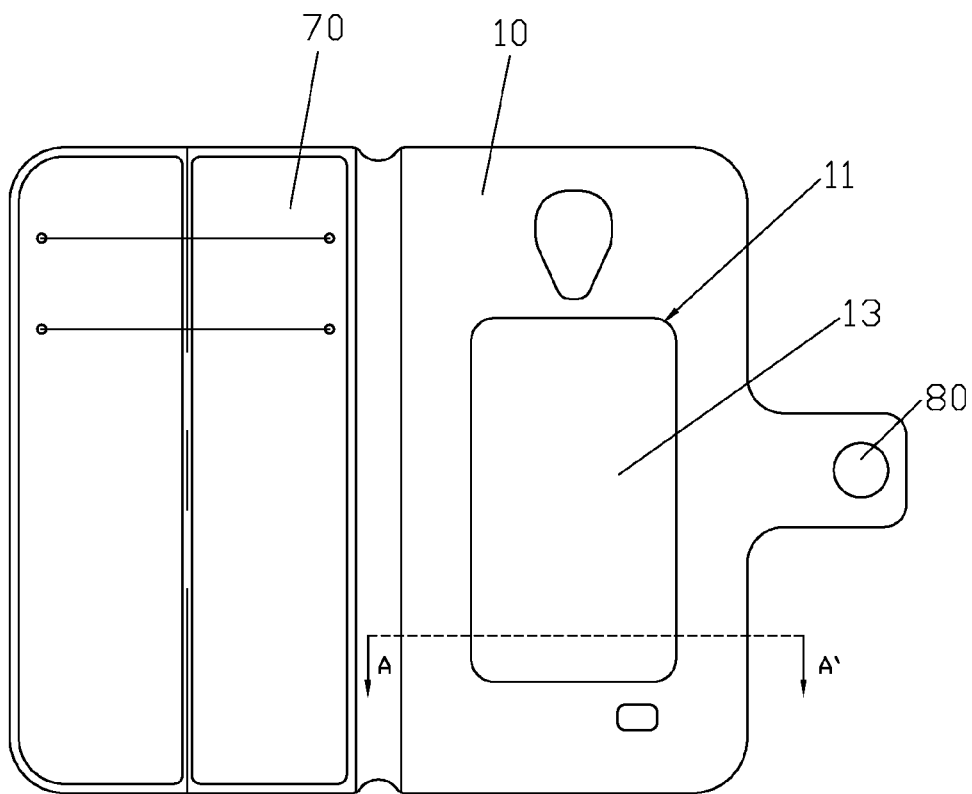
FIG. 1 is a plan view showing the assembly of a heat dissipation case according to a first embodiment of the present invention.
Figure 2:
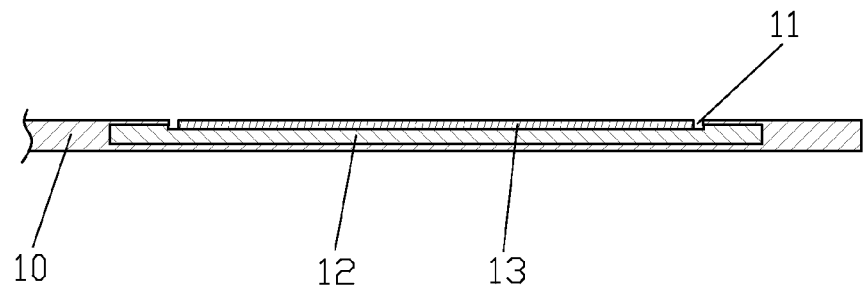
FIG. 2 is a cross sectional view taken along the line A-A' of FIG. 1.
Figure 3:
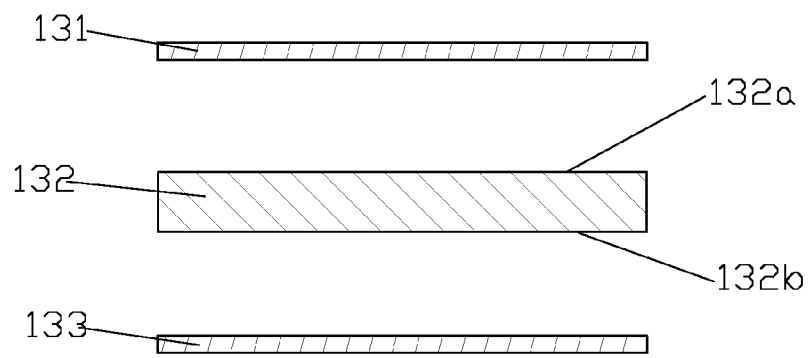
FIG. 3 is an amplified cross sectional view showing a dissipating piece of FIG. 2.

Referring further to FIGS. 1-3, a heat dissipation case 1 according to a first embodiment of the present invention is used to protect electronic equipment and dissipate heat so as to prolong service life of the electronic equipment.

The heat dissipation case 1 comprises: a body 10 and a turning casing 70 connecting with the body 10. The body 10 includes a receiving chamber for receiving electronic equipment and a dissipation groove 11 defined thereon and used to place a metal plate 12 and a dissipating piece 13, such that when the electronic equipment in the receiving chamber contacts with the dissipating piece 13, the dissipating piece 13 dissipates heat of the electronic equipment.

The metal plate 12 has a peripheral side retained in the body 10, and the dissipating piece 13 stacks on the metal plate 12, wherein an area of the dissipating piece 13 corresponds to that of the dissipation groove 11, an area of the metal plate 12 is larger than that of the dissipating piece 13 such that the metal plate 12 dissipates heat to air quickly. Preferably, the metal plate 12 is made of any one of aluminum, silver and copper.

As shown in FIG. 3, the dissipating piece 13 has a heat conducting layer 131, a carrying layer 132, and a heat removing layer 133. The carrying layer 132 has a first face 132a and a second face 132b opposite to the first face 132a, the heat conducting layer 131 is in connection with the first face 132a of the carrying layer 132, the heat removing layer 133 couples with the second face 132b of the carrying layer 132, and the heat removing layer 133 connects with the second face 132b of the carrying layer 132, such that the heat removing layer 131 contacts with the electronic equipment so that the heat of the electronic equipment is conducted to the carrying layer 132 quickly, and then the heat conducts to the metal plate 12 from the carrying layer 132 through the heat removing layer 133, thus dissipating heat to air.

The turning casing 70 is connected with one side of the body 10 and used to cover the body 10, and an area of the turning casing 70 corresponds to that of the body 10, such that the turning casing 70 is rotated to cover the body 10, thereby protecting the electronic equipment. In addition, the body 10 also includes a fixing element 80 so as to fix the body 10 and the turning casing 70 together. The fixing element 80 is a magnetic closure or a belt buckle. It is to be noted that the fixing element 80 can be also mounted on the turning casing 70.

Preferably, the heat dissipation case 1 is a phone leather case, so the body 10 and the turning casing 70 are a leather layer with patterns pressed or engraved thereon so as to have anti-slip function or brand identity. In addition, the leather layer can provided with a metal conducting layer so as to shield electromagnetic radiation or can provided with a protective film made of Polyethylene Terephthalate (PET) so as to achieve scratch resistance.

Figure 4:
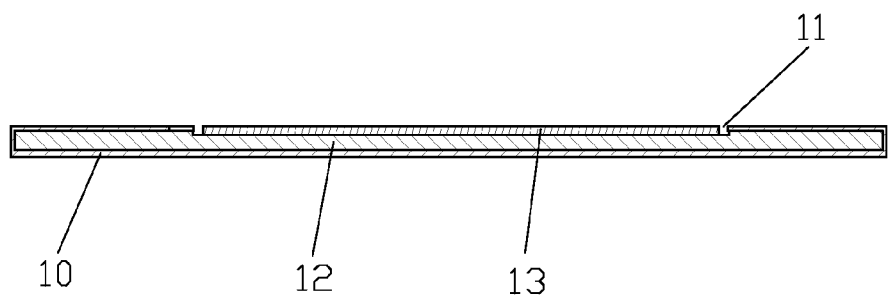
FIG. 4 is a cross sectional view showing the assembly of a heat dissipation case according to a second embodiment of the present invention.

Referring further to FIG. 4, a difference of a heat dissipation case 1 of a second embodiment from that of the first embodiment comprises: a metal plate 12 having a peripheral side extending outwardly to the body 10, such that an area of the metal plate 12 of the second embodiment is larger than those of the metal plate 12 and the dissipating piece 13 of the first embodiment so as to achieve optimum heat dissipation.

Figure 5:
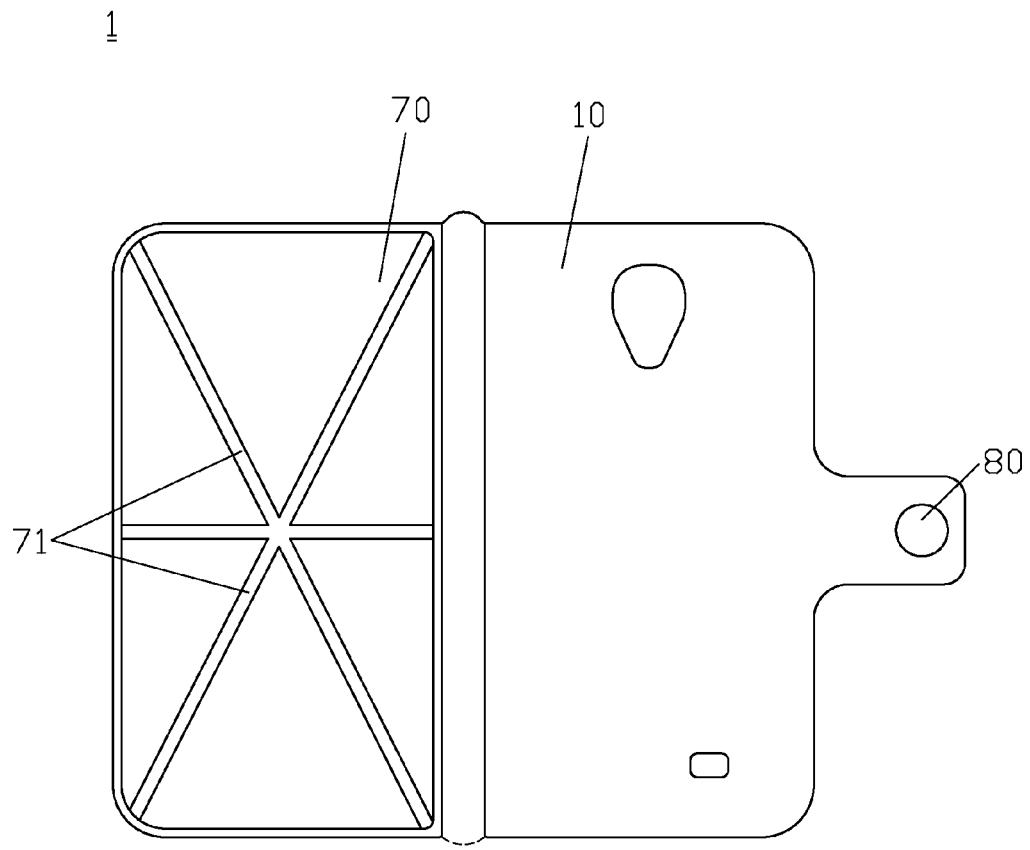
FIG. 5 is a plan view showing the assembly of a heat dissipation case according to a third embodiment of the present invention.

As shown in FIG. 5, a difference of a heat dissipation case 1 of a third embodiment from those of the first embodiment and the second embodiment comprises: a turning casing 70 having plural crease lines 71 pre-pressed thereon such that a user folds the plural crease lines 71 so as to form a support seat of the body 10, and then the electronic equipment received in the body 10 is erected, thereby operating and viewing the electronic equipment conveniently. The crease lines 71 are pre-pressed in a radiation shape (as shown in FIG. 5) or a Y shape (not shown).

Figure 6:
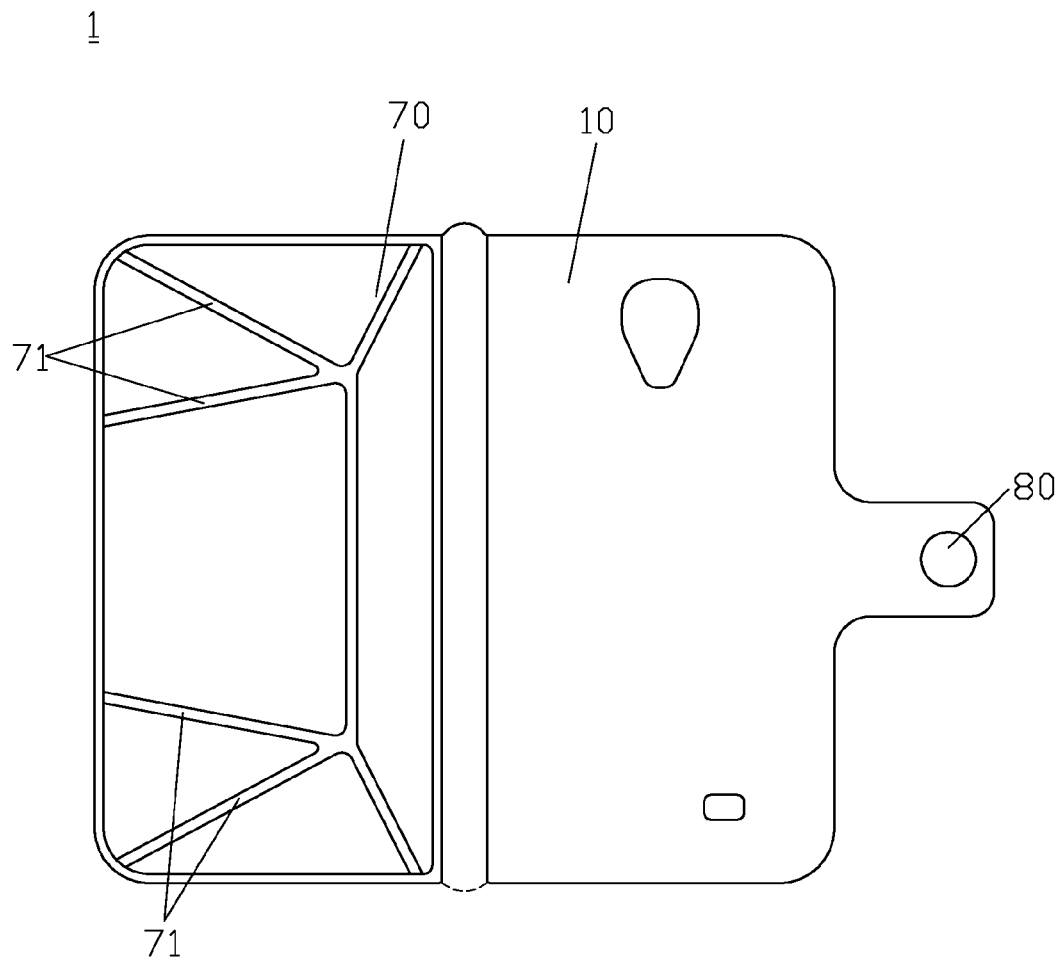
FIG. 6 is a cross sectional view showing the assembly of a heat dissipation case according to a fourth embodiment of the present invention.

As shown in FIG. 6, a difference of a heat dissipation case 1 of a fourth embodiment from those of the first embodiment and the second embodiment comprises: a turning casing 70 having plural crease lines 71 pre-pressed in a combined shape of plural triangles and polygons.

Figure 7:
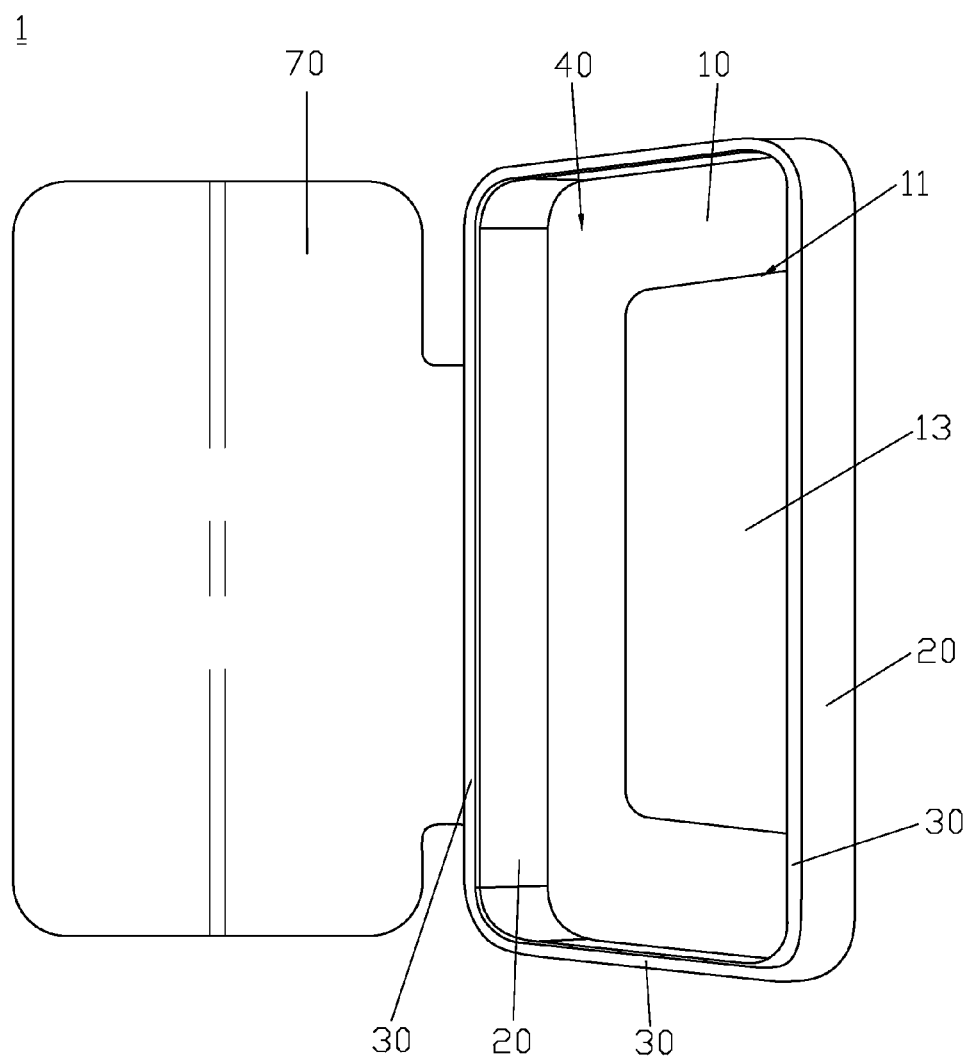
FIG. 7 is a perspective view showing the assembly of a heat dissipation case according to a fifth embodiment of the present invention.
Figure 8:
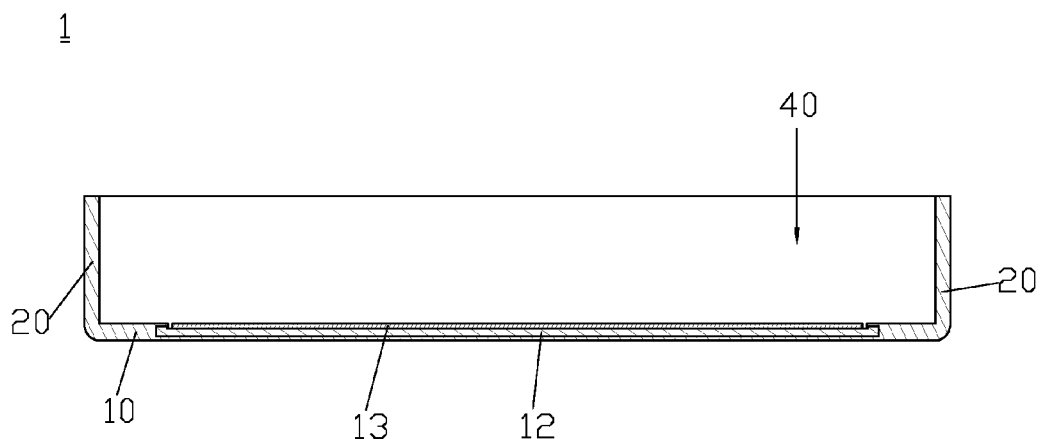
FIG. 8 is an amplified cross sectional view of a part of FIG. 7.

Referring to FIGS. 7 and 8, a difference of a heat dissipation case 1 of a fifth embodiment from that of the first embodiment to the fourth embodiment comprises: a positioning structure fixed on a body 10 and used to position electronic equipment.

The positioning structure includes a plurality of protecting ribs 20 extending upwardly around four sides of the body 10 so that among the body 10 and the plurality of protecting ribs 20 is defined the receiving chamber 40; the plurality of protecting ribs 20 is spaced apart or is connected together around the four sides of the body 10, and the plurality of protecting ribs 20 are integrally formed with the body 10 or it is an independent component and couples with the body 10. The body 10 of this embodiment is any one of those of the first embodiment and the second embodiment.

Preferably, a free end of each protecting rib 20 bends inwardly to form a locking portion so as to fix the heat dissipation case 1 and the electronic equipment securely.

In this embodiment, the heat dissipation case 1 is a phone leather case or other types of cases.

Figure 9:
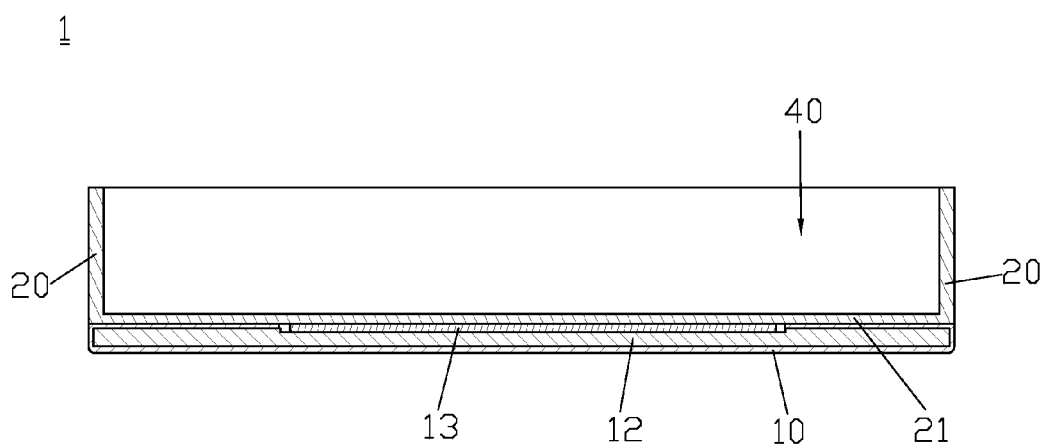
FIG. 9 is a partially cross sectional view showing the assembly of a heat dissipation case according to a sixth embodiment of the present invention.

With reference to FIG. 9, a difference of a heat dissipation case 1 of a sixth embodiment from that of the fifth embodiment comprises a positioning structure.

The positioning structure includes a bottom section 21 and a plurality of protecting ribs 20 extending upwardly around four sides of the bottom section 21 so that among the bottom section 21 and the plurality of protecting ribs 20 is defined the receiving chamber 40. The positioning structure is mounted on the body 10 of the heat dissipation case 1 and is coupled with one side of the dissipating piece 13. It is to be noted that an arrangement of the body 10, the metal plate 12, and the dissipating piece 13 of the sixth embodiment is the same as those of the fifth embodiment.

Figure 10:
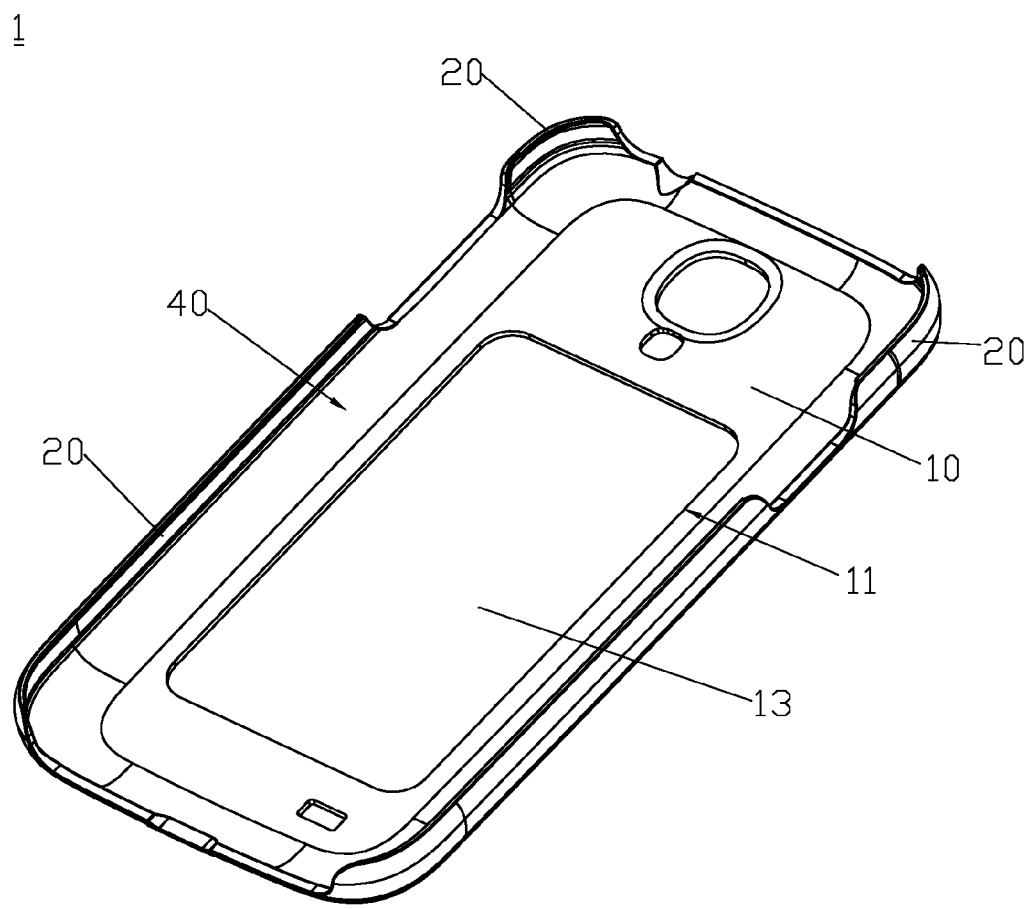
FIG. 10 is a perspective view showing the assembly of a heat dissipation case according to a seventh embodiment of the present invention.

As illustrated in FIG. 10, a heat dissipation case 1 according to a seventh embodiment of the present invention comprises: a body 10 on which a plurality of protecting ribs 20 obliquely extending upward around four sides of the body 10, such that among the body 10 and the plurality of protecting ribs 20 is defined a receiving chamber 40 for receiving electronic equipment. The body 10 also includes a dissipation groove 11 defined thereon and used to place a metal plate (not shown) and a dissipating piece 13, wherein the dissipation groove 11 passes through the body 10 or does not pass through the body 10. The metal plate 12 has a peripheral side retained in the body 10, and the dissipating piece 13 stacks on the metal plate 12, wherein an area of the metal plate 12 is larger than that of the dissipating piece 13, the dissipating piece 13 contacts with the electronic equipment directly, such that the metal plate 12 dissipates heat to air quickly. To increase heat dissipation, the metal plate 12 extends into the body 10 completely. Preferably, the metal plate 12 is made of any one of aluminum, silver and copper.

Preferably, an end portion of each protecting rib 20 bends inwardly to form a locking portion so as to fix electronic equipment.

In this embodiment, the heat dissipation case 1 is applied to protect a phone protective shell.

Figure 11:
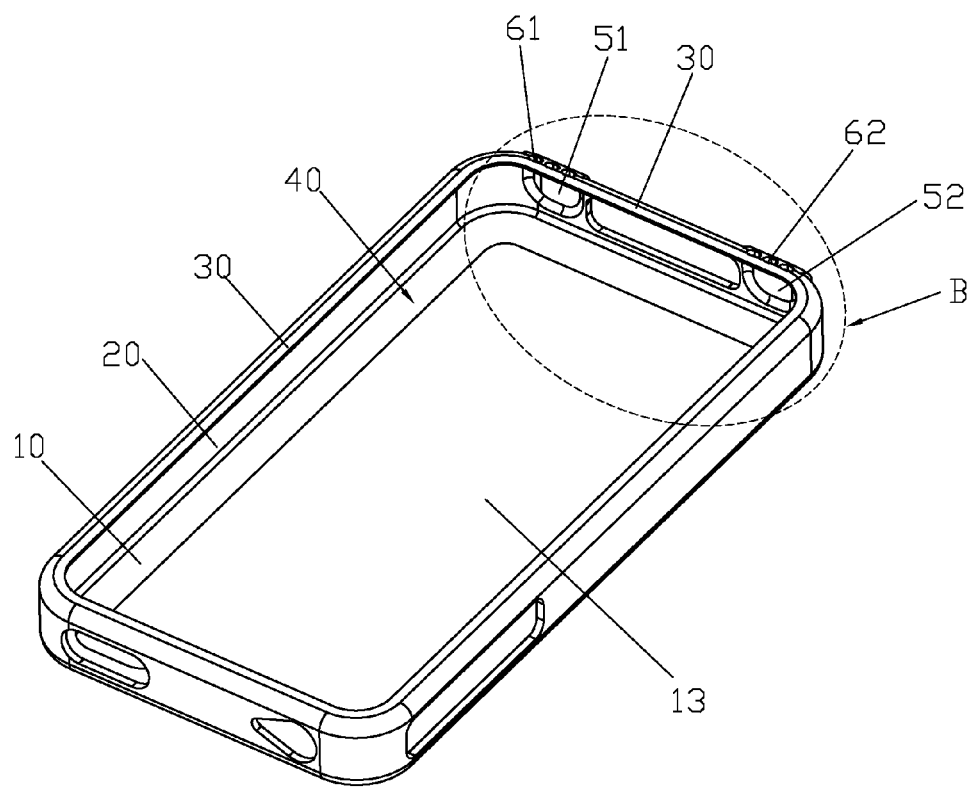
FIG. 11 is a perspective view showing the assembly of a heat dissipation case according to an eighth embodiment of the present invention.
Figure 12:
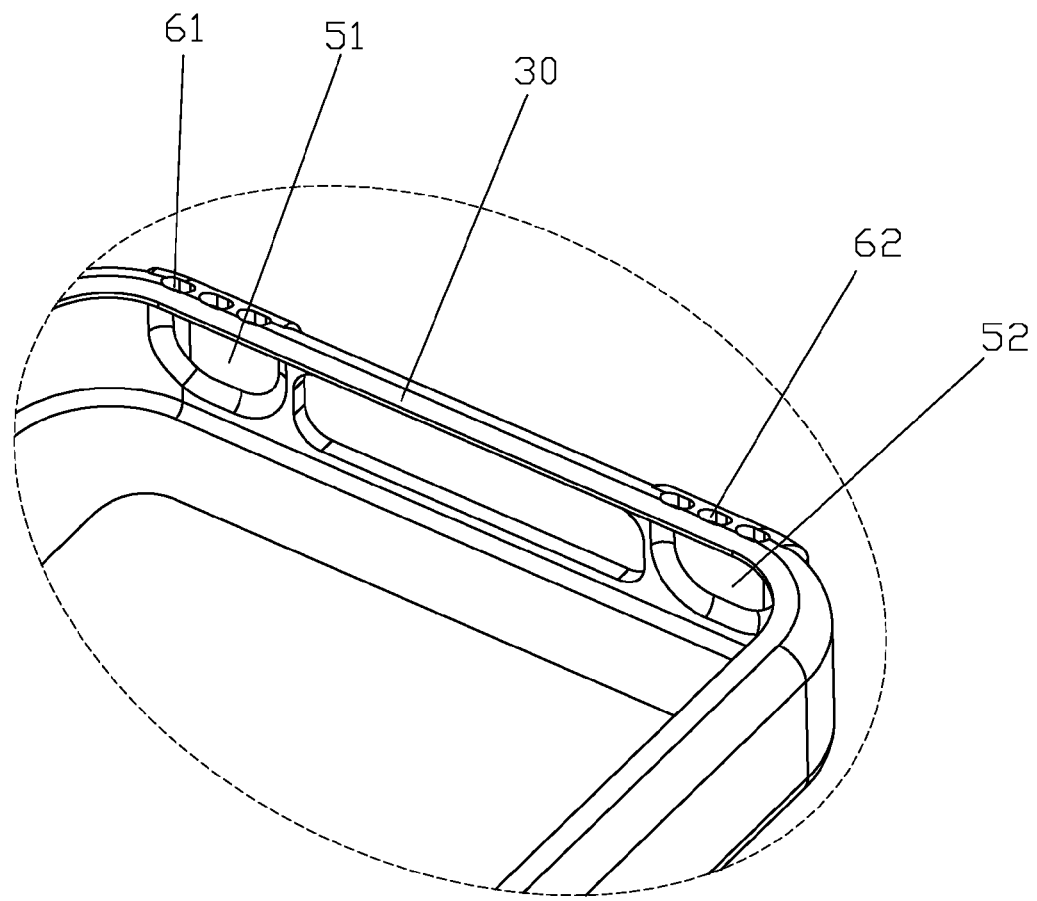
FIG. 12 is a perspective view of a part B of FIG. 11.

As shown in FIGS. 11 and 12, a heat dissipation case 1 according to an eighth embodiment of the present invention comprises: a body 10 on which a plurality of protecting ribs 20 extending upwardly around four sides of the body 10, such that among the body 10 and the plurality of protecting ribs 20 is defined a receiving chamber 40 for receiving electronic equipment. Also, a free end of each protecting rib 20 bends inwardly so as to form a locking portion 30.

After the electronic equipment is received in the receiving chamber 40, a speaker and a microphone of the equipment correspond to two or one of the plurality of protecting ribs 20.

When the speaker and the microphone correspond to two of the plurality of the protecting ribs 20, one protecting rib 20 corresponding to the speaker has a first guiding slot 51 being concaved downwardly therealong, and the locking portion 30 has a plurality of sound orifices 61 formed thereon and corresponding to the first guiding slot 51; another protecting rib 20 corresponding to the microphone has a second guiding slot 52 being concaved downwardly therealong, the locking portion 30 also has a plurality of receiving orifices 62 formed thereon and corresponding to the second guiding slot 52. In addition, when the speaker and the microphone are located on a same outer side of the electronic equipment, one of the plurality of protecting ribs 20 has a first guiding slot 51 and a second guiding slot 52 defined thereon so as to correspond to the speaker and the microphone, and the locking portion 30 has a plurality of sound orifices 61 formed thereon and corresponding to the first guiding slot 51 and has a plurality of receiving orifices 62 formed thereon and corresponding to the second guiding slot 52. In this embodiment, the plurality sound orifices 61 and receiving orifices 62 are preferably located at a same side of the locking portion 30. Thereby, sounds transmit out of the plurality of sound orifices 61 from the speaker via the first guiding slot 51 so as to produce heavy bass, and sounds spreading to a back surface of the electronic equipment are conducted to a front surface of the electronic equipment and then transmits out of the plurality of sound orifices 61, hence the electronic equipment produces sounds loudly. It is to be noted that after a user makes sounds, the sounds are conducted to the second guiding slot 52 through the plurality of receiving orifices 62 and then transmit to the microphone from the second guising slot 52, thus collecting the sounds together.

It is to be noted that an arrangement and an installation of the body 10, the metal plate (not shown), and the dissipating piece 13 of the eighth embodiment are the same as those of the seventh embodiment.

Also, in this embodiment, the heat dissipation case 1 is applied to protect a phone protective shell.

Figure 13:
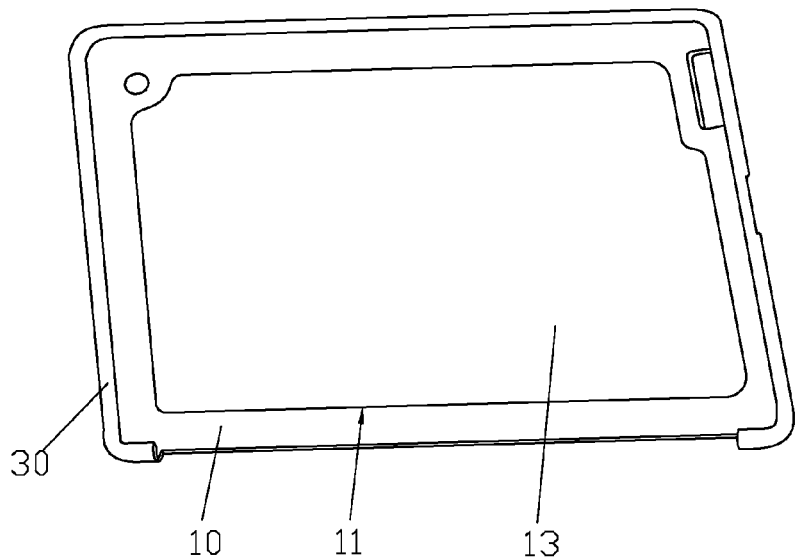
FIG. 13 is a perspective view showing the assembly of a heat dissipation case according to a ninth embodiment of the present invention.
Figure 14:
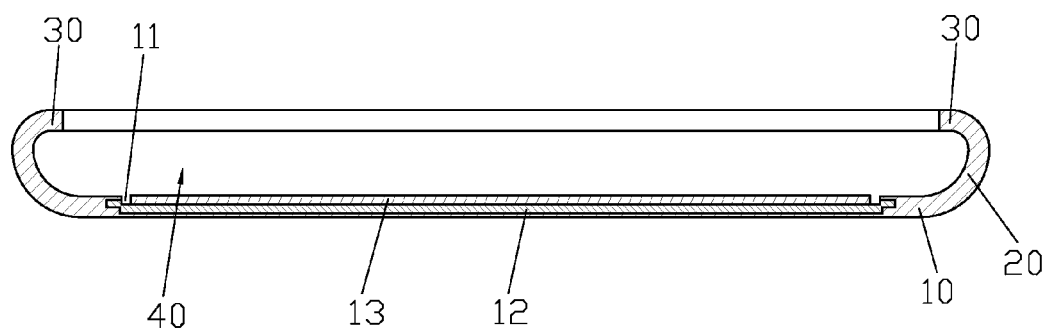
FIG. 14 is a cross sectional view of FIG. 13.

With reference to in FIGS. 13 and 14, a heat dissipation case 1 according to an ninth embodiment of the present invention is a tablet PC protective shell and comprises: a body 10 on which a plurality of protecting ribs 20 extending upwardly around four sides of the body 10, such that among the body 10 and the plurality of protecting ribs 20 is defined a receiving chamber 40 for receiving electronic equipment (such as tablet PC), wherein the body 10 includes a dissipation groove 11 defined thereon, and the dissipation groove 11 passes through the body 10 or does not pass through the body 10 and is served to place the metal plate 12 and the dissipating piece 13. The metal plate 12 has a peripheral side retained in the body 10, and the dissipating piece 13 stacks on the metal plate 12, wherein an area of the metal plate 12 corresponds to that of the dissipating piece 13, and the dissipating piece 13 contacts with the electronic equipment directly, such that the metal plate 12 dissipates heat to air quickly. To enhance heat dissipation, the peripheral side of the metal plate 12 extends into the body 10 completely. Preferably, the metal plate 12 is made of any one of aluminum, silver and copper. Accordingly, the heat of the electronic equipment in the receiving chamber is conducted to the metal plate 12 via the dissipating piece 13 and then is dissipated out of the metal plate 12, thus prolonging service life of the electronic equipment. Also, the area of the metal plate 12 is larger than that of the dissipating piece 13 so as to increase a dissipating area.

Preferably, the dissipating piece 13 has a film (not shown) formed on the front surface thereof and made of metal material, such as silver and copper. In addition, the film can be also made of other heat conducting materials.

Each protecting rib 20 and the locking portion 30 are made of elastic material, such as plastic, hence the electronic equipment is fixed in the heat dissipation case 1 easily and securely. Of course, a respective one of the body 10 and the protecting rib 20 also has a buffer layer formed on one side thereof so as to absorb external stress and to obtain anti-slip effect, thus protecting the electronic equipment.

Figure 15:
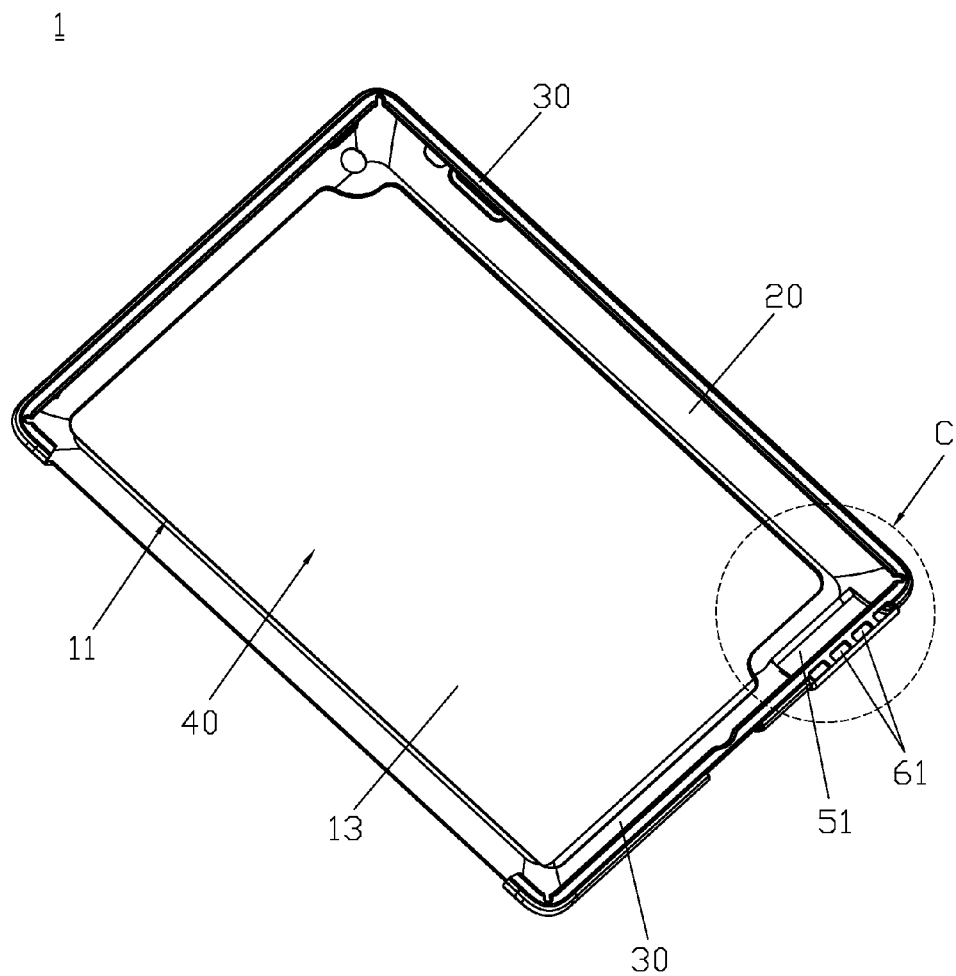
FIG. 15 is a perspective view showing the assembly of a heat dissipation case according to a tenth embodiment of the present invention.
Figure 16:
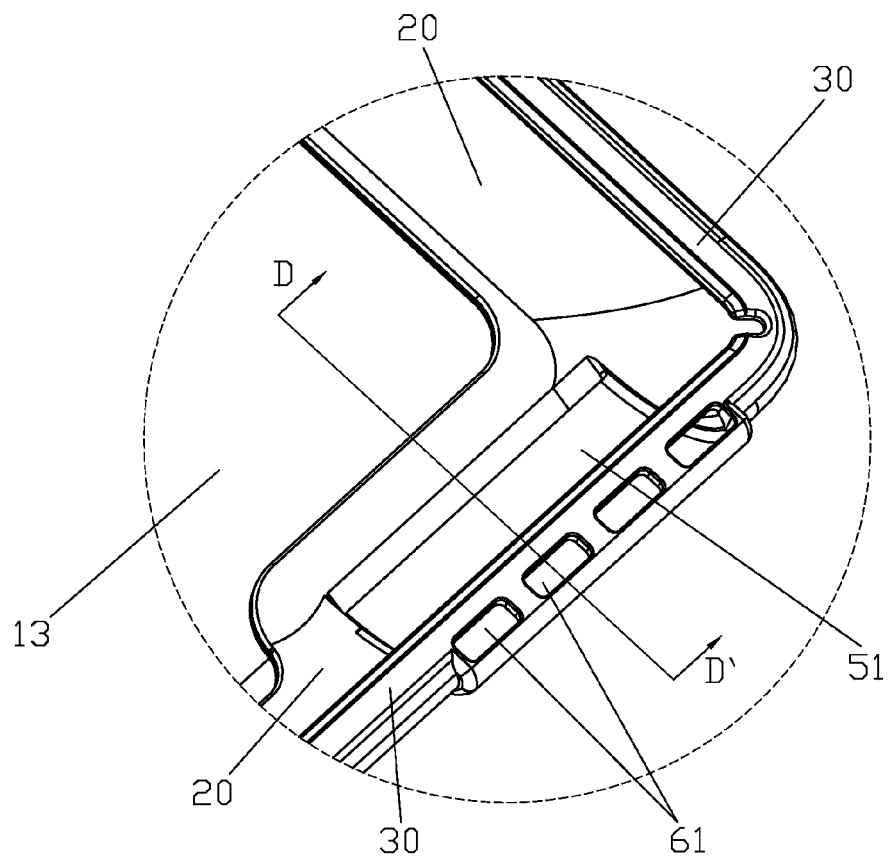
FIG. 16 is a perspective view of a part C of FIG. 15.
Figure 17:
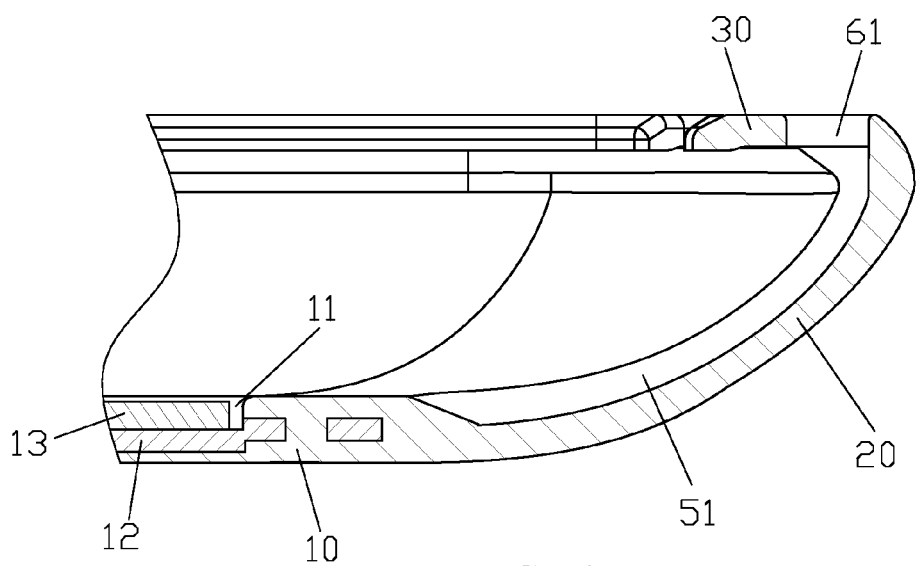
FIG. 17 is a cross sectional view taken along the line D-D' of FIG. 16.
Figure 18:
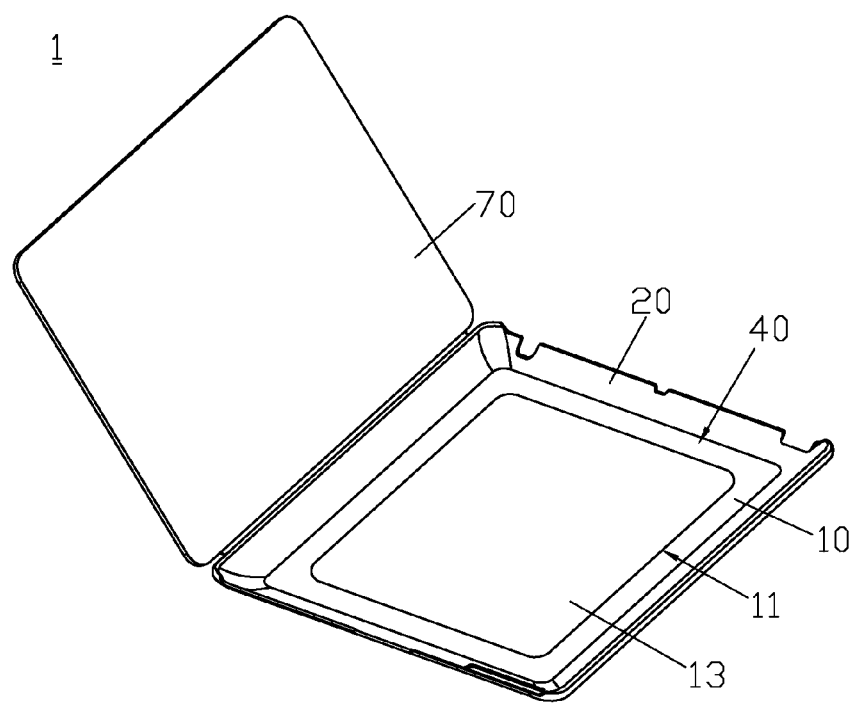
FIG. 18 is a perspective view showing the assembly of a heat dissipation case according to an eleventh embodiment of the present invention.

Referring to FIGS. 15-17, a heat dissipation case 1 according to a tenth embodiment of the present invention is a tablet PC protective shell and comprises: a body 10 on which a plurality of protecting ribs 20 extending upwardly around four sides of the body 10, a free end of each protecting rib 20 bends inwardly so as to form a locking portion 30, such that among the body 10, the plurality of protecting ribs 20, and the locking portion 30 is defined a receiving chamber 40 for receiving electronic equipment; wherein the body 10 includes a metal plate 12 and a dissipating piece 13. An arrangement and a structure of the metal plate 12 and the dissipating piece 13 of this embodiment are the same as those of the ninth embodiment, but a structure of the heat dissipation case 1 of this embodiment is different from that of the ninth embodiment.

One of the plurality of protecting ribs 20 corresponding to the speaker has a first guiding slot 51 being concaved downwardly therealong, and the locking portion 30 has a plurality of sound orifices 61 formed thereon and corresponding to the first guiding slot 51; after the heat dissipation case 1 is fitted on the electronic equipment, the plurality sound orifices 61 faces to a user. Thereby, sounds transmit out of the plurality of sound orifices 61 from the speaker via the first guiding slot 51 so as to produce heavy bass, and sounds spreading to a back surface of the electronic equipment are conducted to a front surface of the electronic equipment and then transmits out of the plurality of sound orifices 61, hence the electronic equipment produces sounds loudly. The heat dissipation case 1 further comprises a second guiding slot 52 defined thereon and corresponding to the speaker, and the locking portion 30 has a plurality of receiving orifices formed thereon and corresponding to the second guiding slot, such that after a user makes sounds, the sounds are conducted to the second guiding slot through the plurality of receiving orifices and then transmit to the microphone from the second guising slot, thus collecting the sounds together.

As shown in FIGS. 18-21, a heat dissipation case 1 according to an eleventh embodiment of the present invention is a tablet PC leather case and comprises: a body 10 and a turning casing 70 connecting with one side of the body 10. The body 10 includes a receiving chamber 40 for receiving electronic equipment and a dissipation groove 11 defined thereon and corresponding to the receiving chamber 40, wherein a metal plate (not shown) and a dissipating piece 13 are stacked in the dissipation groove 11, such that when the electronic equipment in the receiving chamber 40 contacts with the dissipating piece 13, and the dissipating piece 13 dissipates heat of the electronic equipment. An arrangement and a structure of the metal plate 12 and the dissipating piece 13 of this embodiment are any one of those of the first embodiment and the second embodiment, but a size and a shape of the dissipating piece 13 of this embodiment are different from those of the first embodiment and the second embodiment.

In addition, the body 10 further includes the first guiding slot, the plurality of sound orifices, the second guiding slot, and the plurality of receiving orifices of the tenth embodiment. Preferably, the heat dissipation case 1, the body 10, and the turning casing 70 are a leather layer so as to have anti-slip and shock absorbing functions.

Likewise, the turning casing 70 has plural crease lines 71 pre-pressed thereon such that a user folds the plural crease lines 71 so as to form a support seat of the body 10, and then the electronic equipment received in the body 10 is erected, thereby operating and viewing the electronic equipment conveniently.

Figure 19:
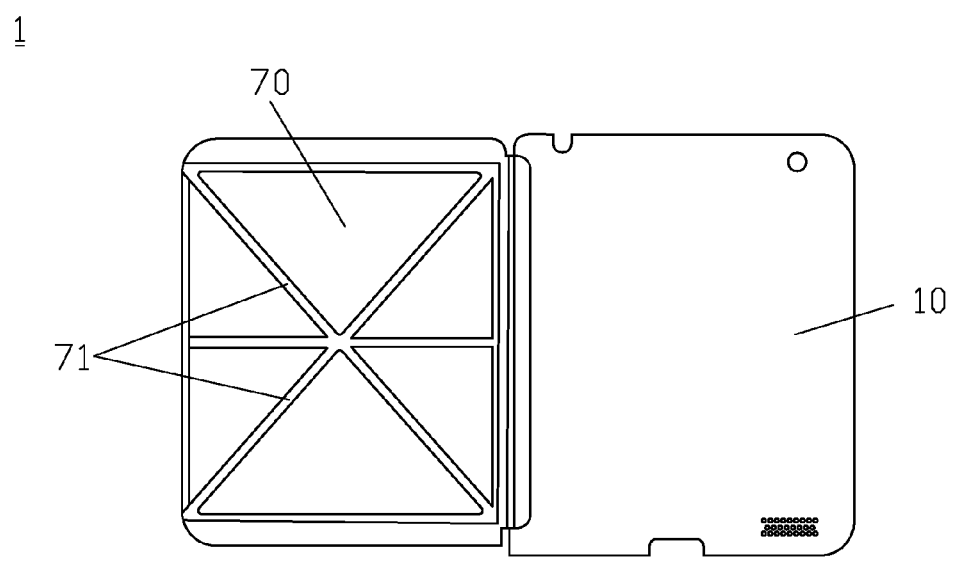
FIG. 19 is a plan view showing the assembly of the heat dissipation case according to the eleventh embodiment of the present invention.
Figure 20:
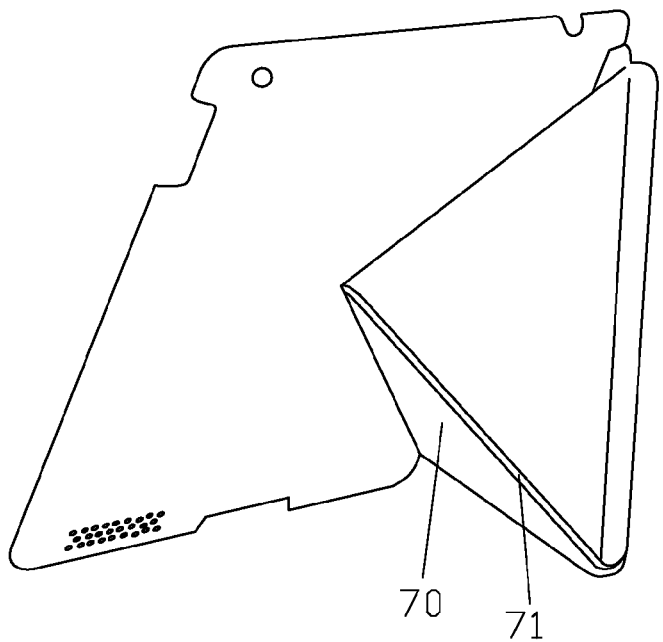
FIG. 20 is a perspective view showing the operation of the heat dissipation case according to the eleventh embodiment of the present invention.
Figure 21:
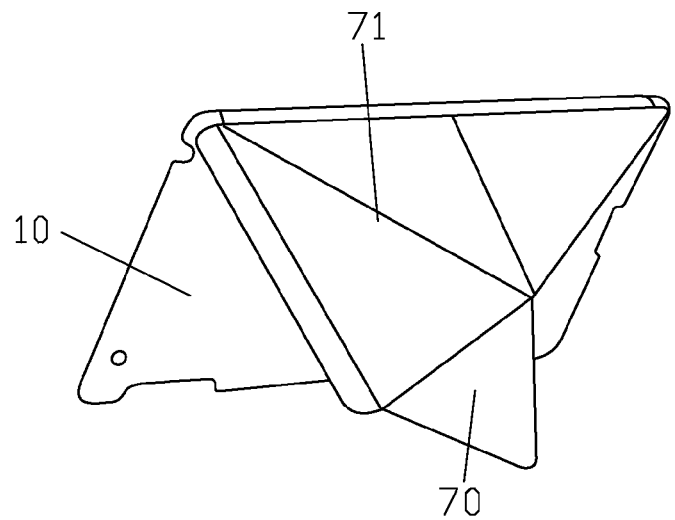
FIG. 21 is another perspective view showing the operation of the heat dissipation case according to the eleventh embodiment of the present invention.

The crease lines 71 are pre-pressed in any one of a radiation shape (as shown in FIG. 19), a Y shape (not shown) and a combined shape of plural triangles and polygons.

It is preferable that the leather layer is provided with a metal conducting layer so as to shield electromagnetic radiation or is provided with a protective film made of Polyethylene Terephthalate (PET) so as to achieve scratch resistance.

Figure 22:
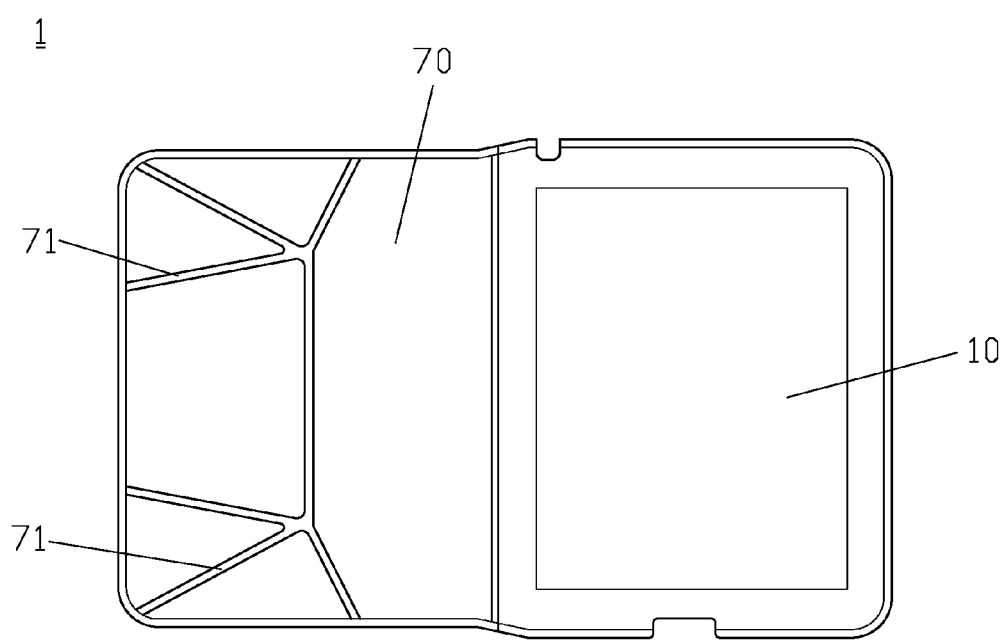
FIG. 22 is a plan view showing the assembly of a heat dissipation case according to a twelfth embodiment of the present invention.

As illustrated in FIG. 22, a heat dissipation case 1 of the twelfth embodiment of the present invention from that of the eleventh embodiment comprises a turning casing 70 having plural crease lines 71 pre-pressed thereon such that a user folds the plural crease lines 71 so as to form a support seat of a body 10, and then the electronic equipment received in the body 10 is erected, thereby operating and viewing the electronic equipment conveniently, wherein the crease lines 71 are pre-pressed in a combined shape of plural triangles and polygons.

Thereby, the body 10 includes the receiving chamber for receiving the electronic equipment and the dissipation groove 11 defined thereon and corresponding to the receiving chamber so as to place the metal plate 12 and the dissipating piece 13, such that the heat of the electronic equipment conducts to the metal plate 12 via the dissipating piece 13, and the heat from the dissipating piece 13 dissipates to air through the metal plate 12. Accordingly, the heat of the electronic equipment is dissipated directly without removing the heat dissipation case 1.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A heat dissipation case being used to dissipate heat of electronic equipment and comprising: a body, the body including a receiving chamber for receiving electronic equipment and a dissipation groove defined thereon and corresponding to the receiving chamber, wherein a metal plate and a dissipating piece are stacked in the dissipation groove, and electronic equipment is received in the receiving chamber and contacts with the dissipating piece so as to dissipates heat of the electronic equipment.

2. The heat dissipation case as claimed in claim 1, wherein the metal plate has a peripheral side retained in the body.

3. The heat dissipation case as claimed in claim 2, wherein the peripheral side of the metal plate extends into the metal plate completely, and an area of the metal plate is larger than that of the dissipating piece.

4. The heat dissipation case as claimed in claim 1, wherein the dissipating piece has a heat conducting layer, a carrying layer, and a heat removing layer, the carrying layer has a first face and a second face opposite to the first face, the heat conducting layer is in connection with the first face of the carrying layer, the heat removing layer couples with the second face of the carrying layer, such that the heat removing layer contacts with the electronic equipment so that the heat of the electronic equipment is conducted to the carrying layer quickly, and then the heat conducts to the metal plate from the carrying layer through the heat removing layer.

5. The heat dissipation case as claimed in claim 1, wherein the body further includes a positioning structure fixed thereon, the positioning structure includes a plurality of protecting ribs extending upwardly around four sides of the body, a free end of each protecting rib bends inwardly to form a locking portion, and among the body, the plurality of protecting ribs, and the locking portion is defined the receiving chamber.

6. The heat dissipation case as claimed in claim 5, wherein one of the plurality of protecting ribs corresponding to a speaker of the electron equipment has a first guiding slot being concaved downwardly therealong, and the locking portion has a plurality of sound orifices formed thereon and corresponding to the first guiding slot.

7. The heat dissipation case as claimed in claim 5, wherein one protecting rib of the plurality of protecting ribs corresponding to a microphone of the electron equipment has a second guiding slot being concaved downwardly therealong, the locking portion also has a plurality of receiving orifices formed thereon and corresponding to the second guiding slot.

8. The heat dissipation case as claimed in claim 5, wherein the positioning structure also includes a bottom section and a plurality of protecting ribs extending upwardly around four sides of the bottom section so that among the bottom section, the plurality of protecting ribs, and the locking portion is defined the receiving chamber.

9. The heat dissipation case as claimed in claim 1 further comprising a turning casing connecting with one side of the body and used to cover the body, the body also including a fixing element 80 so as to fix the body and the turning casing.

10. The heat dissipation case as claimed in claim 9, wherein the turning casing has plural crease lines pre-pressed thereon such that a user folds the plural crease lines so as to form a support seat of the body.

11. The heat dissipation case as claimed in claim 10, wherein the plural crease lines are pre-pressed in any one of a radiation shape, a Y shape, and a combined shape of plural triangles and polygons.

12. The heat dissipation case as claimed in claim 1, wherein the body is a leather layer.

* * * * *